（12）United States Patent
Suzuki et al.

(10) Patent No.: US 10,533,072 B2
(45) Date of Patent: Jan. 14, 2020

(54) METHOD OF PRODUCING POLYARYLENE SULFIDE

(71) Applicant: Kureha Corporation, Chuo-ku, Tokyo (JP)

(72) Inventors: Kenji Suzuki, Tokyo (JP); Michihisa Miyahara, Tokyo (JP); Hiroshi Sakabe, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/099,538

(22) PCT Filed: Feb. 5, 2018

(86) PCT No.: PCT/JP2018/003806
§ 371 (c)(1),
(2) Date: Nov. 7, 2018

(87) PCT Pub. No.: WO2018/159223
PCT Pub. Date: Sep. 7, 2018

(65) Prior Publication Data
US 2019/0367679 A1    Dec. 5, 2019

(30) Foreign Application Priority Data

Feb. 28, 2017   (JP) .................. 2017-037339

(51) Int. Cl.
*C08G 75/0209*   (2016.01)
*C08G 75/0259*   (2016.01)
(52) U.S. Cl.
CPC ..... *C08G 75/0209* (2013.01); *C08G 75/0259* (2013.01)

(58) Field of Classification Search
CPC ................ C08G 75/14; C08G 75/0263; C08G 75/0268; C08G 75/0259; C08G 75/025; B30B 9/28
See application file for complete search history.

(56) References Cited

U.S. PATENT DOCUMENTS

| 4,056,515 A | 11/1977 | Vidaurre |
| 4,060,520 A | 11/1977 | Irvin |
| (Continued) | | |

FOREIGN PATENT DOCUMENTS

| JP | S453368 B1 | 2/1970 |
| JP | S61136523 A | 6/1986 |
| (Continued) | | |

OTHER PUBLICATIONS

English Translation of International Preliminary Report on Patentability dated Sep. 12, 2019 for PCT/2018/003806, 6 pgs.
(Continued)

*Primary Examiner* — Shane Fang
(74) *Attorney, Agent, or Firm* — Abel Schillinger, LLP

(57) ABSTRACT

The production method of the present invention includes: a supplying step of supplying reaction raw materials to at least one of a plurality of reaction vessels that mutually communicate through a gas phase; a polymerizing step of carrying out a polymerization reaction; and a step of removing at least some of the water present in the reaction vessels. Each of the steps is carried out in parallel, and a reaction mixture is transferred sequentially between the reaction vessels. The amount of water contained in the reaction mixture in at least one of the reaction vessels is from 0.1 moles to less than 3 moles per mole of a sulfur source, and the total amount of water contained in the reaction raw materials that are supplied is 3 moles or more per mole of the sulfur source.

10 Claims, 3 Drawing Sheets

(56) References Cited

U.S. PATENT DOCUMENTS

| | | | |
|---|---|---|---|
| 4,066,632 | A | 1/1978 | Anderson et al. |
| 6,538,102 | B1 | 3/2003 | Haubs et al. |
| 2015/0087776 | A1 | 3/2015 | Chiong et al. |

FOREIGN PATENT DOCUMENTS

| | | |
|---|---|---|
| JP | H08100064 A | 4/1996 |
| JP | 2002039462 A | 2/2002 |
| JP | 2002505361 A | 2/2002 |
| JP | 2002121271 A | 4/2002 |
| JP | 2008285596 A | 11/2008 |
| JP | 2012188625 A | 10/2012 |
| JP | 2016532770 A | 10/2016 |

OTHER PUBLICATIONS

International Search Report of PCT/JP2018/003806.
First Office Action issued by the Japanese Patent Office for JP2018-544953 with dispatch date of Nov. 13, 2018.
Translation of the First Office Action issued by the Japanese Patent Office for JP2018-544953 with dispatch date of Nov. 13, 2018.

METHOD OF PRODUCING POLYARYLENE SULFIDE

TECHNICAL FIELD

The present invention pertains to a polyarylene sulfide production method.

BACKGROUND ART

Polyarylene sulfide (hereinafter, also referred to as "PAS"), represented by polyphenylene sulfide (hereinafter, also referred to as "PPS"), is an engineering plastic excelling in heat resistance, chemical resistance, flame retardancy, mechanical strength, electrical characteristics, dimensional stability, and the like. PAS can be formed into various molded products, films, sheets, fibers, and the like by ordinary melt processing methods such as extrusion molding, injection molding, and compression molding. Therefore, PAS has been generally used in a wide range of technical fields such as electrical devices, electronic devices, devices for automobiles, and packaging materials.

A method for producing PAS is disclosed in Patent Document 1.

Patent Documents 2 to 4 disclose PAS continuous polymerization devices in which pressure-resistant polymerization vessels are connected in series, and reaction solutions are transferred between each polymerization vessel using a difference in pressure, and also disclose methods for continuous polymerization of PAS using the devices.

In addition, Patent Document 5 discloses a method for producing sulfur-containing polymers, the method including the steps of (a) preparing in a first reaction vessel a mixture containing a sulfide and a solvent, and (b) reacting an aromatic dihalogen compound and the sulfide in a second reaction vessel to form a sulfur-containing polymer.

CITATION LIST

Patent Literature

Patent Document 1: Japanese Examined Patent Application Publication No. S45-3368A
Patent Document 2: U.S. Pat. No. 4,056,515
Patent Document 3: U.S. Pat. No. 4,060,520
Patent Document 4: U.S. Pat. No. 4,066,632
Patent Document 5: Japanese Unexamined Patent Application Publication (Translation of PCT Application) No. 2002-505361

SUMMARY OF INVENTION

Technical Problem

Ordinarily, it is thought that polymerizing PAS in a short period of time is difficult. The reason for this is that (i) PAS polymerization is a nucleophilic substitution reaction, and therefore the amount of water that is contained in the raw materials that are used when carrying out polymerization in a short period of time is preferably small, but monomer sulfur sources that can be ordinarily procured contain water, and therefore a step for reducing the amount of water content prior to the polymerization reaction becomes necessary, and furthermore, (ii) during the polymerizing step, the sulfur source is present in a state of being reacted and bonded with water, but the water is released in association with the consumption of the sulfur source through the progression of polymerization, and this released water hinders the nucleophilic substitution reaction, and polymerization is thereby retarded. As described above, conventional methods require a step of dehydrating in advance the raw materials containing water.

Patent Document 5 discloses a technique in which a mixture obtained by reacting the sulfur source and solvent in the first reaction vessel is reacted in a second reaction vessel with p-dichlorobenzene, and dehydration of the hydrated water of the sulfur source is carried out during that reaction. However, the weight average molecular weight of the PAS obtained by the method of patent Document 5 is low. Therefore, in order to create a product of the PAS obtained by this method, further polymerization must be performed, and thus the equipment becomes complex. In addition, this method is also insufficient with regard to simplification of the dehydrating step.

The present invention was arrived at in light of the abovementioned issues, and an object thereof is to provide a production method that can be used to easily obtain in a short amount of time a high molecular weight polyarylene sulfide (PAS) with resource and energy savings and low equipment costs using industrially inexpensive water-containing raw materials that exhibit good handling properties.

Solution to Problem

In order to solve the abovementioned problems, a method for producing polyarylene sulfide (PAS) (hereinafter, also referred to as "the present production method") according to one embodiment of the present invention includes: a supplying step of supplying reaction raw materials to at least one of a plurality of reaction vessels that mutually communicate through a gas phase; a polymerizing step of carrying out a polymerization reaction using the plurality of reaction vessels; and a dehydrating step of removing at least some of the water present in the plurality of reaction vessels, wherein each of the steps is carried out in parallel, a reaction mixture is transferred sequentially between the reaction vessels; the amount of water contained in the reaction mixture in at least one of the reaction vessels of the plurality of reaction vessels is from 0.1 moles to less than 3 moles per mole of a sulfur source; the reaction raw materials include an organic polar solvent, a sulfur source, and a dihalo aromatic compound; and the total amount of water contained in the reaction raw materials that are supplied in the supplying step is 3 moles or more per mole of the sulfur source.

Advantageous Effects of Invention

According to one aspect of the present invention, a production method that makes it possible to easily obtain high molecular weight PAS in a short amount of time can be provided.

DESCRIPTION OF EMBODIMENTS

First Embodiment

Hereinafter, an embodiment of the present invention will be described.

Apparatus for Continuous Production of Polyarylene Sulfide

First, the configuration of a polyarylene sulfide (PAS) continuous production apparatus that can be used with respect to the method for producing PAS according to an embodiment of the present invention (hereinafter, also referred to as "the present production method") is described based on FIG. 1.

Figure 1:
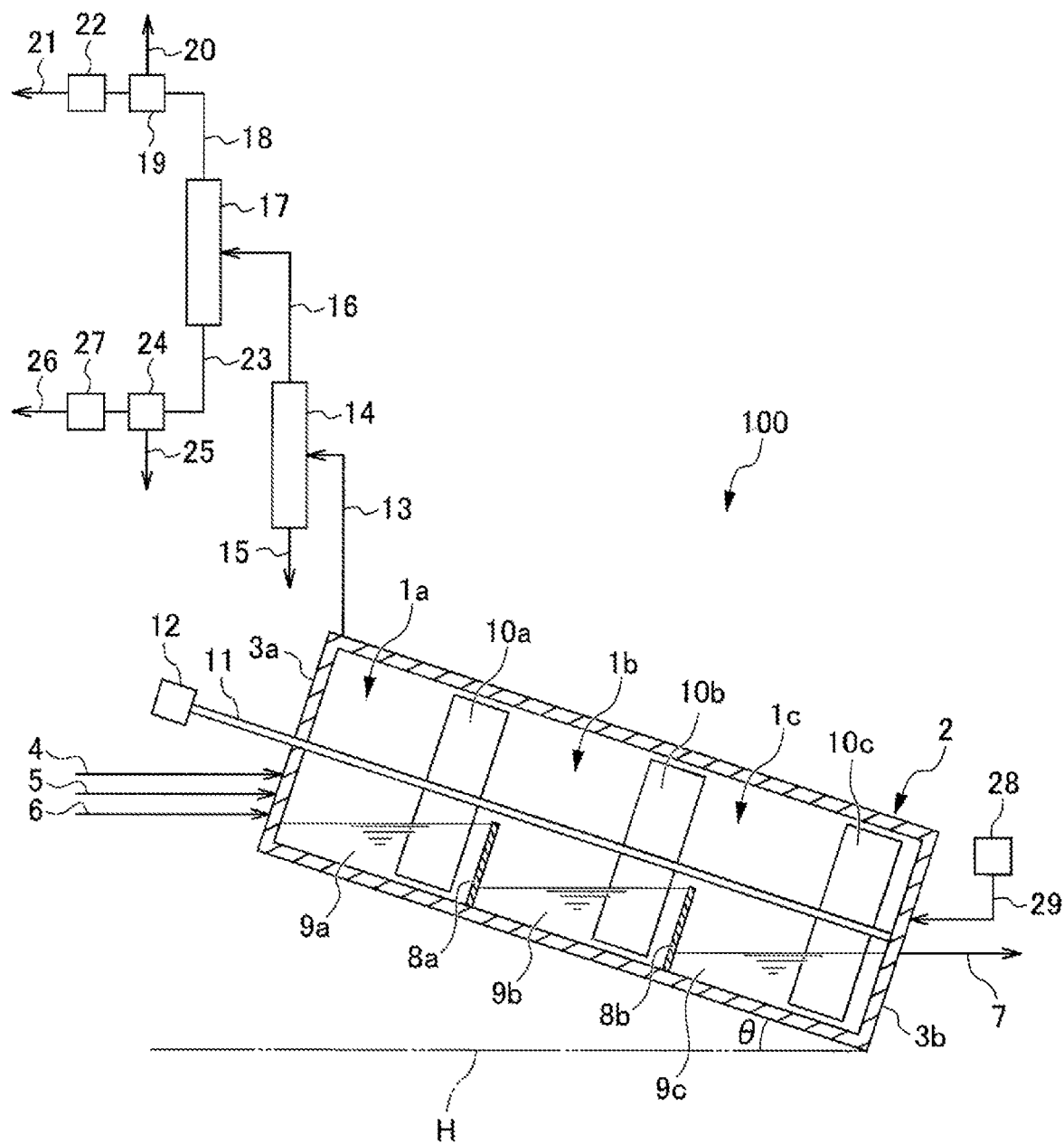
FIG. 1 is a partial cross-sectional view of a PAS continuous production apparatus according to a first embodiment of the present invention.

FIG. 1 is a partial cross-sectional view illustrating a configuration of a PAS continuous production apparatus that can be used with respect to the PAS production method according to the present embodiment.

When described with reference to FIG. 1, a PAS continuous production apparatus 100 is provided with a housing chamber 2 for housing a plurality of reaction vessels 1a, 1b, and 1c. In the PAS continuous production apparatus 100, the housing chamber 2 is installed at an incline so as to form an angle θ with respect to a horizontal plane H illustrated in FIG. 1. The shape of the housing chamber 2 is not particularly limited, and examples include a hollow cylindrical shape or a hollow prismatic shape for which a side wall 3a contacting the reaction vessel 1a and a side wall 3b contacting the reaction vessel 1c are used as bottom surfaces.

Lines for supplying each of the reaction raw materials are connected to the side wall 3a of the housing chamber 2. More specifically, an organic polar solvent supply line 4 for supplying an organic polar solvent to the housing chamber 2, a sulfur source supply line 5 for supplying to the housing chamber 2 at least one type of sulfur source selected from the group consisting of alkali metal sulfides, alkali metal hydrosulfides and hydrogen sulfide, and a dihalo aromatic compound supply line 6 for supplying a dihalo aromatic compound to the housing chamber 2 are respectively connected to the side wall 3a of the housing chamber 2. Note that as necessary, an alkali metal hydroxide supply line (not illustrated) for supplying an alkali metal hydroxide to the housing chamber 2 or a water supply line (not illustrated) for supplying water to the housing chamber 2 may be connected to the side wall 3a.

The reaction raw materials including the organic polar solvent, the sulfur source, and the dihalo aromatic compound, and other optionally used reaction raw materials may be respectively supplied through the gas phase to a liquid phase of the reaction vessel 1a, or may be supplied directly to the liquid phase of the reaction vessel 1a. Note that in the present specification, the term reaction raw materials refers to raw materials that are used in the polymerization reaction of the PAS production method.

A reaction mixture recovery line 7 for recovering the reaction mixture from the housing chamber 2 is connected to the side wall 3b of the housing chamber 2.

The reaction vessel 1a and the reaction vessel 1b are partitioned by a partition wall 8a, and the reaction vessel 1b and the reaction vessel 1c are partitioned by a partition wall 8b. The reaction vessels 1a, 1b, and 1c mutually communicate through the gas phase in the housing chamber 2. As a result, the pressure of the gas phase in the housing chamber 2 becomes uniform. Note that the effect obtained through this type of mutual communication is described later.

The housing chamber 2 is installed at an incline so as to form an angle θ with respect to the horizontal plane H illustrated in FIG. 1, and therefore the maximum liquid surface level of liquid that can be stored is highest in the order of the reaction vessel 1a, the reaction vessel 1b, and the reaction vessel 1c. The reaction vessels 1a, 1b, and 1c are connected in series in the abovementioned order. The effect obtained through this type of connection is described later. Note that with respect to each reaction vessel with the exception of the furthest upstream reaction vessel 1a in the transfer direction of the reaction mixture, a minimum height of the upstream side partition wall in the transfer direction is higher than the maximum liquid surface level of that reaction vessel. That is, with respect to the reaction vessel 1b, the minimum height of the upstream side partition wall 8a in the transfer direction is greater than the maximum liquid surface level of the reaction vessel 1b, and with respect to the reaction vessel 1c, the minimum height of the upstream side partition wall 8b in the transfer direction is greater than the maximum liquid surface level of the reaction vessel 1c. Through this, reverse flow from the reaction vessel 1b to the reaction vessel 1a, and reverse flow from the reaction vessel 1c to the reaction vessel 1b are prevented. The reaction vessels 1a, 1b, and 1c respectively accommodate reaction mixtures 9a, 9b, and 9c.

The reaction vessels 1a to 1c are connected in series in the abovementioned order, and whereby the reaction mixtures are transferred in accordance with the difference in liquid surface levels and gravity. Therefore, according to the present embodiment, there is no need to provide a separate means for transferring a reaction mixture to the next reaction vessel.

In the housing chamber 2, a stirring blade 10a for stirring the reaction mixture 9a in the reaction vessel 1a, a stirring blade 10b for stirring the reaction mixture 9b in the reaction vessel 1b, and a stirring blade 10c for stirring the reaction mixture 9c in the reaction vessel 1c are installed on the same stirring shaft 11. The stirring shaft 11 is installed so as to pierce through the side wall 3a from outside the housing chamber 2 and extend to reach the side wall 3b. A rotational driving device 12 for rotating the stirring shaft 11 is installed at the end of the stirring shaft 11 on the side wall 3a side.

One end of an exhaust line 13 is connected near the side wall 3a of the housing chamber 2. A dehydration unit 14 for removing water from the gas phase in the housing chamber 2 is connected to the other end of the exhaust line 13. The dehydration unit 14 communicates with the gas phase in the housing chamber 2 through the exhaust line 13. One end of an organic polar solvent recovery line 15 is connected to one end (for example, a bottom part) of the dehydration unit 14. One end of a steam recovery line 16 is connected to the other end (for example, a top part) of the dehydration unit 14. A gas-liquid separation unit 17 is connected to the other end of the steam recovery line 16. A reaction raw material separation and recovery unit 19 is connected to the other end of a gas recovery line 18 that is branched from one end (for example, a top part) of the gas-liquid separation unit 17. A waste gas line 20 and a reaction raw material resupply line 21 branch from the reaction raw material separation and recovery unit 19, and a reaction raw material resupply unit 22 for resupplying at least a portion of the reaction raw materials separated and recovered by the reaction raw material separation and recovery unit 19 to at least some of the reaction vessels 1a to 1c is connected to the reaction raw material resupply line 21. Meanwhile, a reaction raw material separation and recovery unit 24 is connected to the other end of a liquid recovery line 23 that is branched from the other end (for example, a bottom part) of the gas-liquid separation unit 17. A wastewater line 25 and a reaction raw material resupply line 26 branch from the reaction raw material separation and recovery unit 24, and a reaction raw material resupply unit 27 for resupplying at least a portion of the reaction raw materials separated and recovered by the reaction raw material separation and recovery unit 24 to at least some of the reaction vessels 1a to 1c is connected to the reaction raw material resupply line 26. At least a portion of the reaction raw materials may be supplied to the liquid phase of at least some of the reaction vessels 1a to 1c through the gas phase, or may be supplied directly to the liquid phase of at least some of the reaction vessels 1a to 1c.

A gas feeding unit 28 that communicates with the gas phase in the housing chamber 2 to feed an inert gas to the gas phase from a downstream side to an upstream side in the transfer direction of the reaction mixture, namely, from the reaction vessel 1c towards the reaction vessel 1a, is connected through a gas feeding line 29 to the side wall 3b of the housing chamber 2. The inert gas is not particularly limited, and examples include argon and other noble gases; nitrogen, and the like.

Next, the PAS production method according to the present embodiment is described along with a description of the operation of the PAS continuous production apparatus based on FIG. 1.

PAS Production Method

The present production method includes: a step of supplying reaction raw materials to at least one of a plurality of reaction vessels that mutually communicate through a gas phase; a polymerizing step of carrying out a polymerization reaction using the plurality of reaction vessels; and a dehydrating step of removing at least some of the water present in the plurality of reaction vessels. These steps are carried out in parallel, and a reaction mixture is transferred sequentially between the reaction vessels. The amount of water contained in the reaction mixture in at least one of the reaction vessels is from 0.1 moles to less than 3 moles per mole of the sulfur source, and the total amount of water contained in the organic polar solvent, the sulfur source, and the dihalo aromatic compound that are supplied as reaction raw materials in the supplying step and in the other reaction raw materials that are optionally used is 3 moles or more per mole of the sulfur source.

When the present production method is specifically described, in the supplying step, each of the reaction raw materials including the organic polar solvent, the at least one type of sulfur source selected from the group consisting of alkali metal sulfides, alkali metal hydrosulfides and hydrogen sulfide, and the dihalo aromatic compound is supplied to the housing chamber 2 through the organic polar solvent supply line 4, the sulfur source supply line 5, and the dihalo aromatic compound supply line 6, respectively. Note that a portion or all of the reaction raw materials may be premixed and then supplied to the housing chamber 2. For example, a mixture of the organic polar solvent and the dihalo aromatic compound, or a mixture of the organic polar solvent and the sulfur source may be prepared in advance, and this mixture may then be supplied to the housing chamber 2. In addition, the mixture may be supplied after being heated, or may be heated, reacted, and then supplied, or may be reacted without heating and then supplied. In this case, for example, in place of the organic polar solvent supply line 4 and the dihalo aromatic compound supply line 6, a mixture supply line (not illustrated) can be connected to the side wall 3a, and the mixture can then be supplied to the housing chamber 2 through this mixture supply line.

As described above, with the present production method, the total amount of water contained in the organic polar solvent, the sulfur source, and the dihalo aromatic compound that are supplied as reaction raw materials and in the other reaction raw materials that are optionally used is 3 moles or more per mole of the sulfur source. The upper limit is not restricted, but is favorably 50 moles or less. The total amount of water that is contained is preferably from 4 moles to 40 moles, and more preferably from 5 moles to 30 moles per mole of the sulfur source. This water content amount is measured by gas chromatography. As one aspect of the present embodiment, the total amount of water contained in the organic polar solvent, the sulfur source, and the dihalo aromatic compound that are supplied as reaction raw materials is 3 moles or more per mole of the sulfur source.

With conventional production methods, the amount of time required for dehydration increases as the amount of water that is contained increases, and therefore a low amount of water content is desirable. However, raw materials with low water content are expensive, and depending on the raw material, handling as a fluid body in a liquid or slurry state can be difficult. However, according to the production method of the present embodiment, there is no need to use a raw material with low water content in order to reduce the dehydration time. Therefore, PAS can be produced using less expensive, easier to handle raw materials.

In the polymerizing step, the supplied organic polar solvent, sulfur source, and dihalo aromatic compound, and the other reaction raw materials that are optionally used are first mixed in the reaction vessel 1a, a polymerization reaction between the sulfur source and the dihalo aromatic compound occurs in the organic polar solvent, and thereby the reaction mixture 9a is formed.

Those materials that are ordinarily used in the production of PAS can be used as the organic polar solvent, at least one type of sulfur source selected from a group consisting of alkali metal sulfides, alkali metal hydrosulfides, and hydrogen sulfide, and the dihalo aromatic compound.

Examples of the organic polar solvent include organic amide solvents. Examples of the organic amide solvents include amide compounds, such as N,N-dimethylformamide and N,N-dimethylacetamide; N-alkylcaprolactam compounds, such as N-methyl-ε-caprolactam; N-alkylpyrrolidone compounds or N-cycloalkylpyrrolidone compounds, such as N-methyl-2-pyrrolidone (NMP) and N-cyclohexyl-2-pyrrolidone; N,N-dialkylimidazolidinone compounds, such as 1,3-dialkyl-2-imidazolidinone; tetraalkyl urea compounds, such as tetramethyl urea; and hexaalkylphosphate triamide compounds, such as hexamethyl phosphate triamide.

Examples of the sulfur source include alkali metal sulfides, alkali metal hydrosulfides, and hydrogen sulfide. The sulfur source is preferably an alkali metal sulfide or an alkali metal hydrosulfide because such sulfur sources are inexpensive and easy to handle. The sulfur source can be used, for example, in a state of an aqueous slurry or an aqueous solution, and is preferably in the state of an aqueous solution from the perspectives of handling ease such as weighing ease and transporting ease.

Examples of alkali metal sulfides include lithium sulfide, sodium sulfide, potassium sulfide, rubidium sulfide, and cesium sulfide.

Examples of alkali metal hydrosulfides include lithium hydrosulfide, sodium hydrosulfide, potassium hydrosulfide, rubidium hydrosulfide, and cesium hydrosulfide.

When an alkali metal hydrosulfide or hydrogen sulfide is used as the sulfur source, an alkali metal hydroxide is used in combination. Examples of the alkali metal hydroxide include lithium hydroxide, sodium hydroxide, potassium hydroxide, rubidium hydroxide, cesium hydroxide, and mixtures of two or more of these. Of these, sodium hydroxide and lithium hydroxide are preferred from the perspective of being available at a low cost for industrial purposes. Moreover, from perspectives such as handling ease, the alkali metal hydroxide is preferably in the form of an aqueous solution or slurry.

When any of the alkali metal sulfides, alkali metal hydrosulfides, and hydrogen sulfide are mixed and used, naturally, the mixture of these will be the sulfur source.

Specific examples of the dihalo aromatic compounds include o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide, and dihalodiphenyl ketone. The halogen atom in a dihalo aromatic compound indicates each atom of fluorine, chlorine, bromine, and iodine. Two halogen atoms in the dihalo aromatic compound may be the same or different. Of these, p-dihalobenzene, m-dihalobenzene or a mixture of these two is preferred, p-dihalobenzene is more preferred, and p-dichlorobenzene (pDCB) is particularly preferred.

Each of the alkali metal sulfide, alkali metal hydrosulfide, and dihalo aromatic compound may be used alone or may be used by mixing two or more types as long as the combination can produce PAS.

Note that, for example, for a case in which the amount of water contained in the reaction raw materials supplied to the housing chamber 2 is relatively small, water may be added to at least one of the reaction vessels 1a to 1c in order to facilitate the polymerization reaction. The amount of water that may be added at that time is not particularly limited, and for example, can be around 0.1 to 10 moles per mole of the sulfur source.

PAS having a weight average molecular weight (Mw) measured through gel permeation chromatography (GPC) of 2000 or greater, preferably 5000 or greater, and particularly preferably 6000 or greater, and also 300000 or less, and preferably 100000 or less can be ultimately obtained by carrying out the polymerization reaction at a temperature of from 170 to 290° C. until the conversion ratio of the dihalo aromatic compound becomes 50% or greater.

In addition, the dihalo aromatic compound conversion ratio is preferably from 50 to 100%, more preferably from 60 to 98%, even more preferably from 65 to 97%, and particularly preferably from 70 to 96%. The conversion ratio of the dihalo aromatic compound can be calculated by determining through gas chromatography the amount of the dihalo aromatic compound remaining in the reaction mixture and then performing a calculation based on the remaining amount of the dihalo aromatic compound, the charged amount of the dihalo aromatic compound, and the charged amount of the sulfur source.

A step of producing and recovering a prepolymer in the polymerization reaction, and further increasing the weight average molecular weight of this prepolymer may be further included.

The weight average molecular weight of the prepolymer is 2000 or greater, preferably 5000 or greater, and particularly preferably 6000 or greater, and is 10000 or less, and preferably 9000 or less.

The conversion ratio of the dihalo aromatic compound when producing the prepolymer is preferably from 50 to 100%, more preferably from 60 to 98%, even more preferably from 65 to 97%, and particularly preferably from 70 to 96%.

In the dehydrating step of the present production method, at least a portion of the water inside the housing chamber 2 is removed from the housing chamber 2 through the gas phase in the housing chamber 2 according to the action (details are described below) of the dehydration unit 14 through the exhaust line 13. Through this, at least a portion of the water present in the reaction vessels 1a to 1c is removed. The water inside the housing chamber 2 includes, for example, water supplied to the housing chamber 2, and water produced by the polymerization reaction. Here, water supplied to the housing chamber 2 indicates, for example, water that has been proactively supplied to the housing chamber 2, and for a case in which water is not proactively supplied to the housing chamber 2, water supplied to the housing chamber 2 indicates water that is ordinarily supplied along with the reaction raw materials to the housing chamber 2 in a state of being contained in the reaction raw materials. Water has a high vapor pressure, and therefore when a large amount of moisture is contained in the gas phase of the housing chamber 2, the inside of the housing chamber 2 can easily become a high pressure state. Therefore, the housing chamber 2 must exhibit pressure resistance, thereby making it difficult to achieve resource savings and a reduction in equipment costs. However, resource savings and a reduction in equipment costs can be effectively realized by carrying out dehydration through the dehydration unit 14 to reduce the pressure inside the housing chamber 2. The pressure inside the housing chamber 2, which is the reaction system, is, for example, preferably from 0.01 MPa to 0.8 MPa, more preferably from 0.02 MPa to 0.65 MPa, even more preferably from 0.03 MPa to 0.39 MPa, and particularly preferably from 0.04 MPa to 0.37 MPa.

As described above, the reaction vessels 1a to 1c mutually communicate through the gas phase in the housing chamber 2, and the pressure of the gas phase in the housing chamber 2 is uniform. Because of this, in the dehydrating step, water is equivalently removed from any of the reaction vessels 1a to 1c by the dehydration unit 14. Therefore, the amount of water in the reaction mixture decreases moving from the reaction vessel 1a to the reaction vessel 1c, or in other words, moving from the upstream side to the downstream side in the transfer direction of the reaction mixture. As a result, hindering of the reaction by water is suppressed, and the polymerization reaction is facilitated. In addition, the boiling point of the reaction mixture increases, and therefore polymerization at high temperatures becomes possible, and the polymerization reaction can be further facilitated. Furthermore, through the above-described facilitation of the polymerization reaction, the temperature of the reaction mixture easily increases, and the polymerization reaction is more easily facilitated.

As described above, with the PAS continuous production apparatus 100, for example, each unit is disposed as described above, and by carrying out a continuous reaction entirely, the temperatures of the reaction vessels 1a to 1c can be increased from the upstream side to the downstream side in the transfer direction. In other words, the reaction vessels 1a to 1c are provided so that the internal temperature of the reaction vessels 1a to 1b becomes higher from the upstream side to the downstream side in the transfer direction of the reaction mixture.

Moreover, as described above, the reaction vessels 1a to 1c are connected in decreasing order from the highest maximum liquid surface level of liquid that can be accommodated by each of the reaction vessels. Through this, in a step of transferring the reaction mixture, the reaction mixture can be sequentially transferred using the difference in heights of the maximum liquid surface level. More specifically, when the reaction mixture 9a and the reaction mixture 9b exceed the maximum liquid surface levels, the reaction mixtures thereof can pass over the partition walls 8a and 8b, respectively. The shapes of the partition walls 8a and 8b are not particularly limited, and may be any optional shape as long as the mutual communication of the reaction vessels 1a, 1b, and 1c through the gas phase in the housing chamber 2 is not hindered. In addition, the partition walls 8a and 8b may also be configured with an opening part such as a through opening or slit (neither is illustrated) for example provided in the partition wall so that the reaction solution is transferred through this opening part.

In the present embodiment, the internal temperature of the supply reaction vessel, that is, the internal temperature of the reaction vessel 1a to which the reaction raw materials are supplied in the present embodiment, is preferably from 110 to 230° C., more preferably from 140 to 220° C., and even more preferably from 150 to 210° C. In addition, the internal temperature of the adjacent reaction vessel that is adjacent to the supply reaction vessel, that is, the internal temperature of the reaction vessel 1b in the present embodiment, is preferably from 170 to 260° C., more preferably from 180 to 250° C., and even more preferably from 190 to 240° C. In the present embodiment, the difference in internal temperatures between mutually adjacent reaction vessels is preferably 2° C. or greater, more preferably 3° C. or greater, and even more preferably 5° C. or greater.

In the present embodiment, an inert gas is preferably fed by the feeding unit 28 to the gas phase in the housing chamber 2 from a downstream side to an upstream side in the transfer direction of the reaction mixture, namely, from the reaction vessel 1c towards the reaction vessel 1a. As described above, in order to maintain the state in which the amount of water in the reaction mixture decreases from the upstream side to the downstream side in the transfer direction of the reaction mixture, preferably, the configuration is such that moisture evaporated from the reaction mixture does not flow to the abovementioned downstream side and condense above the reaction mixture. The water vapor flow to the downstream side and condensation above the reaction mixture can be effectively prevented by feeding the inert gas to the abovementioned gas phase in the manner described above using the gas feeding unit 28.

The flow rate of the inert gas is not particularly limited as long as it is within a range that inhibits the flow of water vapor to the downstream side. For example, for a case in which the housing chamber 2 has a hollow cylindrical shape which has an inner radius r and uses the side wall 3a and the side wall 3b as the bottom surfaces, when the flow rate of the inert gas is represented by u, and the volumetric flow rate of the inert gas is represented by F, then the flow rate of the inert gas is expressed by $u=F/(\pi r^2)$. Here, if the water vapor does not easily flow to the downstream side, Taylor dispersion holds true. That is, when consideration is given to the change from molecular diffusion domination to convection diffusion domination, the inequality equation $r \cdot u \gg D$ (wherein, D is the diffusion coefficient of water vapor) holds true as a condition for Taylor dispersion to hold true. From the above, the flow rate of the inert gas is a value that is within a range such that, for example, $F \gg D \cdot \pi r$, more specifically, $F>10D \cdot \pi r$, preferably $F>25D \cdot \pi r$, and more preferably $F>50D \cdot \pi r$ hold true. Note that for a case in which the housing chamber 2 has a hollow columnar shape for which the side wall 3a and the side wall 3b are used as the bottom surfaces, and the vertical cross section in the transfer direction of the reaction mixture has any optional shape, a representative length in the vertical direction in the transfer direction of the reaction mixture, for example, the equivalent circular radius of the cross-section, which has any optional shape, is used as r, and can be applied in the abovementioned equation.

The shaft 11 is rotated by the rotational driving device 12, and in association therewith, the stirring blades 10a to 10c installed on the shaft 11 rotate around the shaft 11, and stir the reaction mixtures 9a to 9c. The stirring blades 10a to 10c are installed on the same shaft 11. Therefore, all of the stirring blades 10a to 10c are rotated with the same conditions by merely rotating the shaft 11 by the rotational driving device 12, and homogeneous stirring can thereby be realized with high efficiency.

As the abovementioned polymerization reaction advances, NaCl and other alkali metal halides are deposited and accumulated in the reaction vessels 1a to 1c. As a result, for example, the volume that is effective for advancing sufficient polymerization reactions in the reaction vessels 1a to 1c is reduced, and decreases in productivity and the like easily occur. Therefore, excessive maintenance operations to remove the accumulated alkali metal halides must be performed. However, by stirring the reaction mixtures 9a to 9c through the stirring blades 10a to 10c, the alkali metal halides are easily dispersed in the reaction mixtures 9a to 9c, transferred to the abovementioned downstream side, and discharged to outside the housing chamber 2. On the other hand, if the stirring is too intense, the reaction mixture flows over the partition wall 8a and/or the partition wall 8b, and is unnecessarily and easily mixed into a downstream side reaction vessel from an upstream side reaction vessel.

Preferably, the stirring blade shape, quantity, rotational speed, and the like are adjusted, as appropriate, so that dispersion of alkali metal halides can be facilitated, and unnecessary mixing of reaction mixtures between the reaction vessels 1a to 1c can be avoided. Of these, the rotational speed of the stirring blades is, for example, set as a condition so that the alkali metal halides do not precipitate, and more specifically, the rotational speed is set so that the stirring speed by the stirring blades is at or above the particle floating limit stirring speed. Note that from the perspective of easily preventing the reaction mixture from flowing over the partition wall 8a and/or the partition wall 8b, the upper limit of the tip speed of the stirring blade is preferably a speed such that the rotational speed of the stirring blades becomes 60 rpm or less and more preferably 20.5 rpm or less. Moreover, the rotational paths and the like of the stirring blades are also preferably adjusted, as appropriate, so that stirring is sufficiently performed. For example, preferably, the stirring blades pass through at least a portion which is deeper than an average depth of each of the reaction vessels 1a to 1c. In particular, preferably, stirring is sufficiently implemented in the vicinity of the deepest parts of the reaction vessels 1a to 1c, and the sizes of the gap between the stirring blade 10a and the bottom part of the reaction vessel 1a, the gap between the stirring blade 10a and the partition wall 8a, the gap between the stirring blade 10b and the bottom part of the reaction vessel 1b, the gap between the stirring blade 10b and the partition wall 8b, the gap between the stirring blade 10c and the bottom part of the reaction vessel 1c, and the gap between the stirring blade 10c and the side wall 3b are made small so that alkali metal halides do not accumulate.

Exhaust from the housing chamber 2 is supplied through the exhaust line 13 to the dehydration unit 14. The dehydration unit 14 acts, for example, as a distillation column, and a liquid having an organic polar solvent as the main component is recovered from one end (the lower part for example), and steam containing the sulfur source, the dihalo aromatic compound, and water is recovered from the other end (the upper part for example).

The organic polar solvent recovered from the dehydration unit 14 may be subjected, as appropriate, to refining, etc., and then once again supplied to the housing chamber 2 as a reaction raw material for the polymerization reaction. At that time, supply, to the housing chamber 2, of the recovered organic polar solvent may be performed through the organic polar solvent supply line 4, or may be performed through an organic polar solvent supply line other than the organic polar solvent supply line 4. The supply destination of the recovered organic polar solvent may be any one of the reaction vessels 1a to 1c, or may be a combination of two or more thereof.

The steam recovered from the abovementioned other end of the dehydration unit 14 is supplied through the steam recovery line 16 to the gas-liquid separation unit 17. The gas-liquid separation unit 17 acts, for example, as a distillation column, and a gas containing the sulfur source is recovered from one end (the upper part for example), and a liquid containing the dihalo aromatic compound and water is recovered from the other end (the lower part for example).

The gas recovered from the one end of the gas-liquid separation unit 17 is supplied through the gas recovery line 18 to the reaction raw material separation and recovery unit 19. The sulfur source is separated and recovered from the gas at the reaction raw material separation and recovery unit 19, and is sent through the reaction raw material resupply unit 22 to the reaction raw material resupply line 21. Meanwhile, the remaining gas is discarded as waste gas through the waste gas line 20.

At least a portion of the sulfur source separated and recovered by the reaction raw material separation and recovery unit 19 is resupplied to at least one of the reaction vessels 1a to 1c by the reaction raw material resupply unit 22. At that time, resupply, to the reaction vessel 1a, of the separated and recovered sulfur source may be performed through the sulfur source supply line 5, or may be performed through a sulfur source supply line other than the sulfur source supply line 5. Through resupply of at least a portion of the sulfur source, the sulfur source can be effectively used, and resource savings can be achieved.

The liquid recovered from the gas-liquid separation unit 17 is supplied through the liquid recovery line 23 to the reaction raw material separation and recovery unit 24. The dihalo aromatic compound is separated and recovered from the liquid at the reaction raw material separation and recovery unit 24, and is sent through the reaction raw material resupply unit 27 to the reaction raw material resupply line 26. Meanwhile, the remaining liquid is discarded as wastewater through the wastewater line 25.

Therefore, at least a portion of the dihalo aromatic compound separated and recovered by the reaction raw material separation and recovery unit 24 is resupplied to at least one of the reaction vessels 1a to 1c by the reaction raw material resupply unit 27. At that time, resupply to the reaction vessel 1a of the separated and recovered dihalo aromatic compound may be performed through the dihalo aromatic compound supply line 6, or may be performed through a dihalo aromatic compound supply line other than the dihalo aromatic compound supply line 6. Through resupply of at least a portion of the dihalo aromatic compound, the dihalo aromatic compound can be effectively used, and resource savings can be achieved.

In addition, gravitational force is used for matters such as transferring the reaction mixture based on the height differences of the maximum liquid surface levels, and therefore a significant amount of energy is not required to drive the PAS continuous production apparatus 100. Hence, the PAS continuous production apparatus 100 can easily enable resource savings, energy savings, and reductions in equipment costs, etc.

In the present production method, the water content amount of the reaction mixture in at least one of the reaction vessels 1a to 1c is from 0.1 moles to less than 3 moles, preferably from 0.2 moles to less than 2 moles, and more preferably from 0.3 moles to less than 1.7 moles per mole of the sulfur source. Note that the water content amount of the reaction mixture can be adjusted to within a prescribed range by controlling the pressure of the gas phase parts of the reaction vessels 1a to 1c and the temperature of the liquid phase parts of the reaction vessels 1a to 1c. Hindering of the nucleophilic substitution reaction can be suppressed and retardation of polymerization can be prevented by setting the water content amount of the reaction mixture to within the above-described range. As a result, PAS can be polymerized in a short amount of time. Note that the water content amount includes also water that is generated during the reaction.

According to the present production method, even in cases in which the total water content amount of each of the reaction raw materials such as the organic polar solvent, the sulfur source, and the dihalo aromatic compound is large, there is no need to adjust in advance the water that is contained in these various reaction raw materials. Therefore, the production time of the PAS that is ultimately obtained can be reduced by directly inserting these various reaction raw materials into the above-described PAS continuous production apparatus.

The present embodiment may further include a step of increasing the weight average molecular weight of the PAS that is obtained after the polymerization reaction. Increasing the weight average molecular weight of the PAS can be carried out, for example, by using a polymerization aid in the polymerization reaction. Specific examples of this type of polymerization aid include organic metal carboxylates, organic metal sulfonates, lithium halides, alkali metal salts of sulfuric acid, alkaline earth metal oxides, alkali metal phosphates, and alkaline earth metal phosphates. These can be used alone or two or more types can be simultaneously used. Of these, organic metal carboxylates or lithium halides are preferably used. More specific examples include lithium acetate, sodium acetate, potassium acetate, sodium propionate, lithium benzoate, sodium benzoate, sodium phenylacetate, sodium p-toluate and lithium halide. Of these, lithium acetate or sodium acetate is preferably used, and sodium acetate is more preferably used from the perspective of procurement ease at a low price.

These polymerization aids may be used alone or may be used by mixing two or more types as long as the combination can produce the PAS.

In the present embodiment, when the total amount of water contained in the reaction raw materials is considered to be 100 mass %, the amount of water contained in the above-described supply reaction vessel, that is, in the reaction vessel 1a, is preferably from 5 mass % to 99 mass %, more preferably from 6 mass % to 90 mass %, and even more preferably from 7 mass % to 80 mass %. The amount of water contained in the supply reaction vessel is preferably within this range because when within such range, the amount of water that is removed in the polymerizing step is reduced.

In addition, the amount of water contained in the adjacent reaction vessel that is adjacent to the supply reaction vessel on the downstream side, that is, in the reaction vessel 1b, is preferably from 5 mass % to 50 mass %, more preferably from 6 mass % to 40 mass %, and even more preferably from 7 mass % to 30 mass %. The amount of water contained in the adjacent reaction vessel is preferably within this range because when within such range, the amount of water that is removed in the polymerizing step is reduced.

Note that in the present embodiment, a PAS production method that uses a specific apparatus was described, but the production method according to the present invention may further include other steps as long as: the production method at least uses a plurality of reaction vessels that mutually communicate through a gas phase, and includes the above-described supplying step, polymerizing step, and dehydrating step; these various steps are carried out in parallel; the reaction mixture is sequentially transferred between these reaction vessels; the total water content amount of the various reaction raw materials such as the organic polar solvent, the sulfur source, and the dihalo aromatic compound is 3 moles or greater per mole of the sulfur source; and the water content amount of the reaction mixture present in at least one of the plurality of reaction vessels is from 0.1 moles to less than 3 moles per mole of the sulfur source.

In addition, reaction vessels of a specific shape were used in the present embodiment, but the shape of the reaction vessels is not particularly limited.

Furthermore, the number of reaction vessels in the present embodiment is not particularly limited. Also, the reaction vessels do not necessarily have to be connected in series as illustrated in FIG. 1. Therefore, for example, some of the plurality of reaction vessels may be aligned in parallel.

Furthermore, in the present embodiment, the above-described feeding step for feeding an inert gas is preferably performed in parallel with the various above-described steps. In addition, the above-described separating and recovering step and resupplying step are preferably carried out in parallel with the above-described steps.

Moreover, in the present embodiment, a configuration in which the reaction raw materials are supplied to the reaction vessel 1a was described, but the reaction vessel to which the reaction raw materials are supplied is not specified.

Second Embodiment

Next, another embodiment of the present invention will be described in detail.

Figure 2:
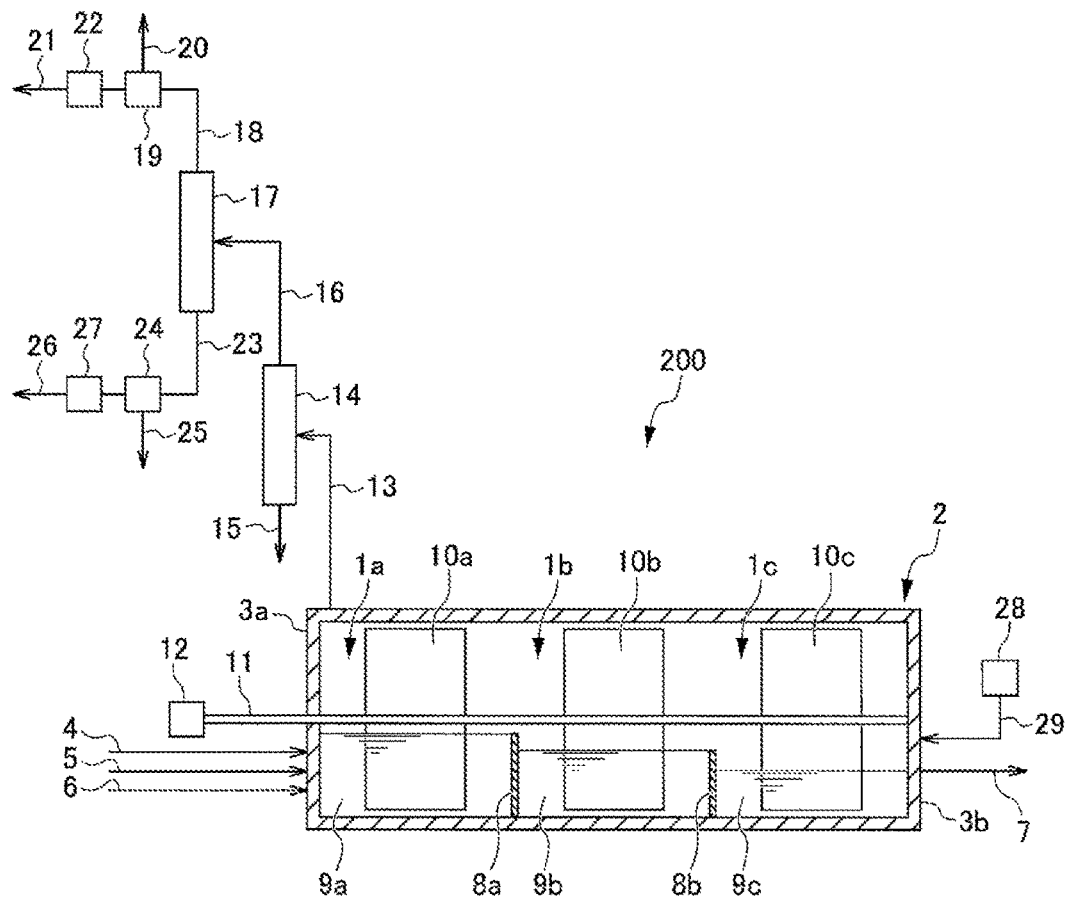
FIG. 2 is a partial cross-sectional view of a PAS continuous production apparatus according to a second embodiment of the present invention.

FIG. 2 is a partial cross-sectional view illustrating another PAS continuous production apparatus that can be used with respect to the present production method. Hereinafter, the configuration and action of the PAS continuous production apparatus according to the present embodiment is described based on FIG. 2. Note that members having the same function as members described in the first embodiment are assigned the same reference signs, and descriptions thereof are omitted.

In the present embodiment, a PAS continuous production apparatus 200 used in the present production method is the same as the PAS continuous production apparatus 100 of the first embodiment with the exception that the housing chamber 2 is installed horizontally, the dimensions of the partition wall 8a and the dimensions of the partition wall 8b differ, and the connection position of the reaction mixture recovery line 7 in the side wall 3b differs.

As illustrated by FIG. 2, if the bottom surface areas of the reaction vessels 1a to 1c are the same, the PAS continuous production apparatus 200 operates in the same manner as the PAS continuous production apparatus 100 (see FIG. 1) presented in the first embodiment with the exception that the amount of reaction mixture that can be accommodated is reduced in order of the reaction vessels 1a, 1b, and 1c.

With the PAS continuous production apparatus 200, unlike the PAS continuous production apparatus 100, the depth of each of the reaction vessels 1a to 1c is nearly constant according to the location. Hence, alkali metal halides produced by the polymerization reaction easily accumulate on the overall bottom surfaces of the reaction vessels 1a to 1c, and therefore sufficient stirring by the stirring blades 10a to 10c is particularly preferable. In order to sufficiently perform stirring by the stirring blades 10a to 10c so that alkali metal halides are not deposited, the width of the stirring blades 10a to 10c is preferably wide, and for example, is 50% or more, preferably 60% or more, more preferably 70% or more, and even more preferably 80% or more of the width of the reaction vessels 1a to 1c. In addition, all or some of the stirring blades 10a to 10c are preferably positioned at the centers of the reaction vessels from perspectives such as not easily generating a large deviation in the stirring.

With respect to the present invention, cases in which the stirring shaft 11 is a single shaft were presented in the abovementioned Embodiments 1 and 2, but the stirring shaft 11 may be multiple shafts of two or more shafts.

Third Embodiment

Next, yet another embodiment of the present invention will be described in detail.

Figure 3:
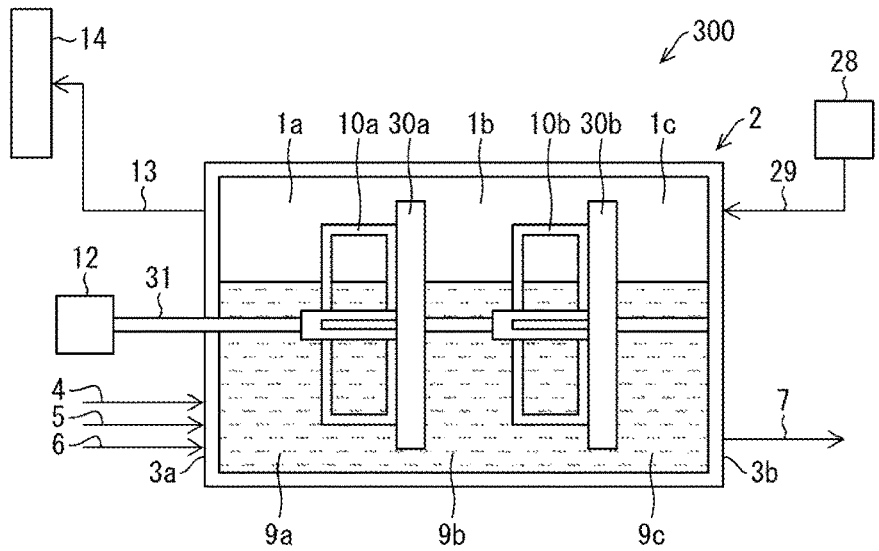
FIG. 3 is a partial cross-sectional view of a PAS continuous production apparatus according to a third embodiment of the present invention.

FIG. 3 is a partial cross-sectional view illustrating another PAS continuous production apparatus that can be used in the present production method. Hereinafter, the configuration and action of the present embodiment is described based on FIG. 3.

When described with reference to FIG. 3, a PAS continuous production apparatus 300 differs from the above-described embodiments in that a segregation means for segregating the reaction vessels in the housing chamber 2 is a dividing plate having a rotating center, rather than a partition wall.

In the present embodiment, the reaction vessel 1a and the reaction vessel 1b are partitioned by a dividing plate 30a, and the reaction vessel 1b and the reaction vessel 1c are partitioned by a dividing plate 30b. The reaction vessels 1a, 1b, and 1c mutually communicate through the gas phase in the housing chamber 2.

Moreover, a stirring blade 10a for stirring the reaction mixture 9a in the reaction vessel 1a is attached to one surface of the dividing plate 30a. Likewise, a stirring blade 10b for stirring the reaction mixture 9b in the reaction vessel 1b is attached to one surface of the dividing plate 30b. Note that the stirring blades 10a and 10b in the present embodiment have a configuration in which an opening is provided at the interior side.

The stirring blades 10a and 10b and the dividing plates 30a and 30b are all installed on the same rotating shaft 31. The rotating shaft 31 is installed so as to pierce through the side wall 3a from outside the housing chamber 2 and extend to reach the side wall 3b. A rotational driving device 12 for rotating the rotating shaft 31 is installed at the end of the rotating shaft 31 on the side wall 3a side.

Note that the stirring blades can be installed at any optional position with respect to the dividing plates. A dividing plate may be located at the upstream side of a stirring blade, may be at the downstream side, or a mixture of both may be present. The dividing plate may be separated from the stirring blade, but the dividing plate can be fixed and reinforced by tightly affixing and connecting the dividing plate and the stirring blade as illustrated by FIG. 3, and thus such a configuration is preferable. Moreover, the stirring blade and the dividing plate do not necessarily have to be a pair, and a location where a stirring blade is not present between adjacent stirring blades may exist. The progression of the polymerization reaction can be aided, and solids in the reaction mixture can be more smoothly transferred by providing at least one stirring blade. Alternatively, a stirring blade does not need to be provided, and through this, a simpler apparatus configuration is made possible.

The shape of the dividing plate is not particularly limited, and may be any optional shape that has a rotating center, and provides a clearance of a prescribed width or an opening part so that adjacent reaction vessels are in communication while the vertical cross-section inside the housing chamber 2 is partially blocked. For example, for a case in which the housing chamber 2 has a hollow cylindrical shape, as illustrated in FIG. 3, the dividing plate may be a disk-shaped dividing plate having a radius which is slightly smaller than the internal space of the housing chamber. Note that the shape of the dividing plate is not limited to this, and may be a cage-shaped rotating article not having a center shaft.

The number of dividing plates provided on the rotating shaft may be an optional number of one or more according to factors such as the size of the housing chamber and the polymerization reaction type.

For cases in which two or more dividing plates are provided, these may be the same shape, or respectively different shapes.

Moreover, the position of each dividing plate is not particularly limited, and each dividing plate can be provided at an optional position.

The shape of the stirring blade is also not particularly limited, and the stirring blade is provided on the same shaft as that of the dividing plate, and may have any optional shape for stirring the reaction mixture. As illustrated in FIG. 3, the stirring blades 10a, 10b may be attached to one of either of the surfaces of the dividing plates 30a, 30b, or may be attached to both surfaces. Alternatively, the stirring blades 10a, 10b may be attached on the rotating shaft 31 separate from the dividing plates 30a, 30b.

The reaction vessels 1a to 1c are mutually communicated through the liquid phase part thereof. As a result, the raw materials and solvent supplied to the reaction vessel 1a are moved sequentially, as a reaction mixture, to the reaction vessel 1b and the reaction vessel 1c while polymerization reaction advances.

The reaction vessels 1a to 1c mutually communicate through the gas phase part thereof. As a result, the pressure of the gas phase in the housing chamber 2 becomes uniform. Furthermore, the evaporation components generated during polymerization inside each reaction vessel are sequentially moved through this gas phase part in a direction from the reaction vessel 1c to the reaction vessel 1b and the reaction vessel 1a by the temperature difference, etc. inside the apparatus, and are discharged from the exhaust line 13.

With the PAS continuous production apparatus 300 of the present embodiment, a clearance of a prescribed width is present between an inner wall of the housing chamber 2, and the respective outer edges of the dividing plates 30a, 30b. Through this, the gas phase parts of adjacent reaction vessels mutually communicate, and the liquid phase parts of adjacent reaction vessels mutually communicate, and as a result, the reaction mixture and a gas containing the evaporation components are moved. Note that instead of providing a clearance, an opening part such as a through hole or a slit for example can be provided in the dividing plate, and the reaction vessels may mutually communicate through the opening part. Alternatively, both a clearance and an opening part may be provided. Or, the dividing plate may have a mesh shape having a plurality of fine through holes.

The width of the clearance or the size of the opening part is not particularly limited, and can be set, as appropriate, according to the shape of the container, the shape and quantity of dividing plates, and the like.

Fourth Embodiment

Next, yet another embodiment of the present invention will be described in detail.

The PAS continuous production apparatus according to the present embodiment (not illustrated) has a plurality of reaction vessels disposed adjacent in the vertical direction inside the housing chamber. Mutually adjacent reaction vessels are partitioned by a dividing plate that is fixed without a gap, and are configured so that the reaction mixture moves sequentially through a connection pipe from the upper reaction vessel to the lower reaction vessel. In addition, the gas phase parts of each of the reaction vessels mutually communicate through a communication pipe. Therefore, the pressure of the gas phase of each of the reaction vessels in the housing chamber 2 is nearly the same. The communication pipe that makes the gas phase parts communicate mutually may be the same as the connection pipe through which the reaction mixture sequentially moves, or may be a pipe that is provided separately from the connection pipe. Here, the present embodiment is described in detail using, as an example, a case in which a first reaction vessel and a second reaction vessel are provided in order from the top side in the vertical direction. The first reaction vessel and the second reaction vessel mutually communicate through a first connection pipe, and a pipe wall of the first connection pipe projects to the first reaction vessel side. The height of the pipe wall of the first connection pipe is established so as to be equal to the maximum liquid surface level of liquid that can be accommodated by the first reaction vessel. The first connection pipe pierces through a first dividing plate that partitions the first reaction vessel and the second reaction vessel.

With the PAS continuous production apparatus configured in this manner, when the height of the reaction mixture exceeds the maximum liquid surface level of the first reaction vessel, the reaction mixture flows over the pipe wall of the first connection pipe and into the first connection pipe, passes through the first connection pipe, and flows into the second reaction vessel. As a configuration of this type of PAS continuous production apparatus, the reaction mixture may also be sequentially moved.

In addition, the first reaction vessel and the second reaction vessel are configured so that the gas phase part of the first reaction vessel and the gas phase part of the second reaction vessel mutually communicate through a connection pipe or a communication pipe.

Fifth Embodiment

Next, yet another embodiment of the present invention will be described in detail.

Figure 4:
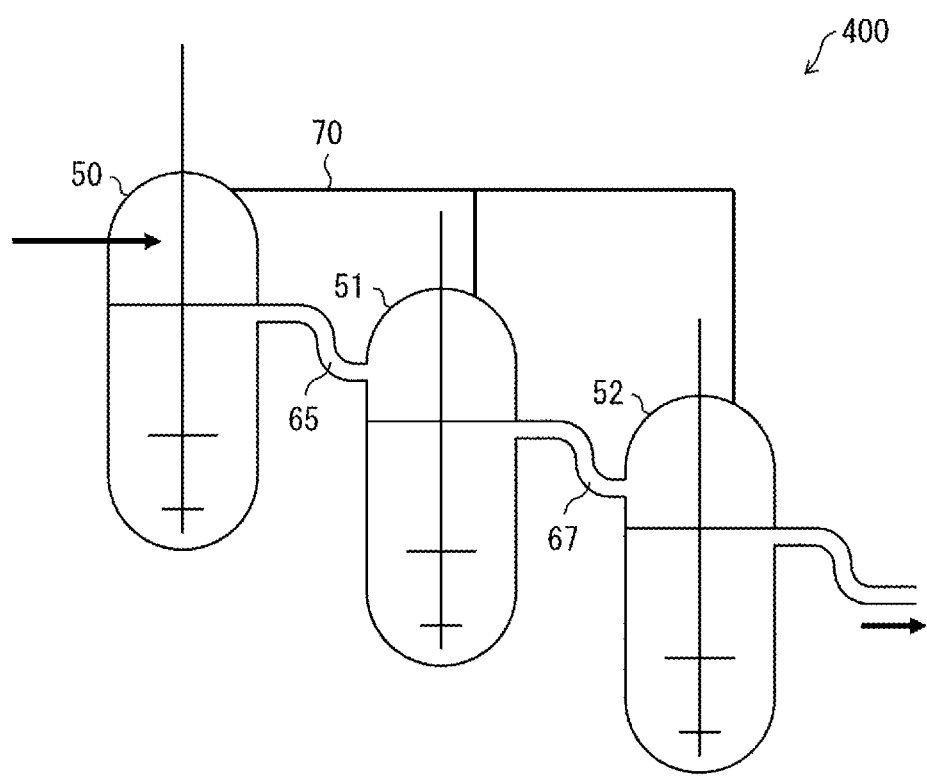
FIG. 4 is an image schematically illustrating a configuration of a PAS continuous production apparatus according to a fifth embodiment of the present invention.

FIG. 4 is an image schematically illustrating a modified example of a configuration of the PAS continuous production apparatus.

When described with reference to FIG. 4, a PAS continuous production apparatus 400 is provided with a first reaction vessel 50, a second reaction vessel 51, and a third reaction vessel 52. The second reaction vessel 51 is disposed vertically lower than the first reaction vessel 50, and the third reaction vessel 52 is disposed vertically lower than the second reaction vessel 51.

The first reaction vessel 50 and the second reaction vessel 51 are connected through a first pipe 65. In addition, the second reaction vessel 51 and the third reaction vessel 52 are connected through a second pipe 67.

The first pipe 65 is provided so that when the reaction mixture (not illustrated) in the first reaction vessel 50 exceeds the maximum liquid surface level, the reaction mixture passes through the first pipe 65 and moves to the second reaction vessel 51. In addition, the second pipe 67 is provided so that when the reaction mixture (not illustrated) in the second reaction vessel 51 exceeds the maximum liquid surface level, the reaction mixture passes through the second pipe 67 and moves to the third reaction vessel 52.

Furthermore, a ventilation unit 70 is connected to each of the first to third reaction vessels 50 to 52. The first to third reaction vessels 50 to 52 mutually communicate through the gas phase through the ventilation unit 70.

Through this type of configuration of the PAS continuous production apparatus 400, the same effect as that of the above-described embodiments is obtained even when the height difference in the respective maximum liquid surface levels of the first reaction vessel 50 and the second reaction vessel 51 is used to sequentially transfer the reaction mixture. Furthermore, according to the PAS continuous production apparatus 400, there is no need to provide a partition wall like that presented with Embodiments 1 and 2, or a dividing plate like that presented with Embodiment 3.

The PAS continuous production apparatuses of the second to fifth embodiments are configured differently than the PAS continuous production apparatus of the first embodiment, but all of the embodiments have in common a configuration where gas phase parts of the reaction vessels mutually communicate. Therefore, dehydration is carried out by the same configuration as that of the PAS continuous production apparatus of the first embodiment. Accordingly, similar to the case in which the PAS continuous production apparatus of Embodiment 1 is used, the water content amount of the reaction mixture can be adjusted.

SUMMARY

As described above, a method for producing polyarylene sulfide (PAS) according to one embodiment of the present invention includes: a supplying step of supplying reaction raw materials to at least one of a plurality of reaction vessels that mutually communicate through a gas phase; a polymerizing step of carrying out a polymerization reaction using the plurality of reaction vessels; and a dehydrating step of removing at least some of the water present in the plurality of reaction vessels, wherein each of the steps is carried out in parallel, the reaction mixture is transferred sequentially between the reaction vessels; the amount of water contained in the reaction mixture in at least one of the reaction vessels of the plurality of reaction vessels is from 0.1 moles to less than 3 moles per mole of a sulfur source; the reaction raw materials include an organic polar solvent, a sulfur source, and a dihalo aromatic compound; and the total amount of water contained in the reaction raw materials that are supplied in the supplying step is 3 moles or more per mole of the sulfur source.

In one embodiment of the present production method, at least some of the plurality of reaction vessels may be connected in series.

In one embodiment of the present production method, the plurality of reaction vessels are connected in decreasing order from a highest maximum liquid surface level of liquid that can be accommodated in each reaction vessel, and a height difference in the maximum liquid surface levels may be used to sequentially transfer the reaction mixture.

In one embodiment of the present production method, the supplying step, the polymerizing step, the reaction mixture transferring step, and the dehydrating step may be carried out in parallel.

In one embodiment of the present production method, a feeding step of feeding an inert gas from a downstream side towards an upstream side in the direction of transfer of the reaction mixture may be carried out in parallel with each of the steps.

In one embodiment of the present production method, a separating and recovering step for separating and recovering some of the reaction raw materials, and a resupplying step for supplying at least some of the reaction raw materials to at least one of the reaction vessels may be carried out in parallel with each of the above-described steps.

In one embodiment of the present production method, the reaction vessels may be provided so that internal temperatures thereof become higher from an upstream side to a downstream side in the transfer direction of the reaction mixture.

In one embodiment of the present production method, the pressure in the reaction system is preferably from 0.01 MPa to 0.8 MPa.

In one embodiment of the present production method, a step of increasing the weight average molecular weight of the polyarylene sulfide that is obtained after the polymerizing step may be further included.

In one embodiment of the present production method, when the amount of water contained in the reaction raw materials that are supplied is 100 mass %, the amount of water contained in a supply reaction vessel to which the reaction raw materials are supplied is from 50 mass % to 95 mass %, and the amount of water contained in an adjacent reaction vessel that is adjacent to the first reaction vessel on the downstream side is from 5 mass % to 50 mass %.

In one embodiment of the present embodiment, the total amount of water contained in the organic polar solvent, the sulfur source, and the dihalo aromatic compound that are supplied as reaction raw materials in the supplying step is 3 moles or more per mole of the sulfur source.

Embodiments of the present invention will be described in further detail hereinafter using examples. The present invention is of course not limited to the examples below, and it goes without saying that various modes are possible with regard to the details. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Example 1

A PAS continuous production apparatus that was the same as the apparatus illustrated by FIG. 1 with the exception of having six reaction vessels formed by dividing the housing chamber 2 by five partition walls was used. This PAS continuous production apparatus was a reaction apparatus made of titanium with semicircular partition walls and dimensions of a diameter of 100 mm×a length of 300 mm. The PAS continuous production apparatus was charged with 950 g of NMP, after which a temperature 1 of a portion delimited by a first partition wall and a second partition wall from the upstream side was maintained at 230° C., and a temperature 2 of a portion delimited by a third partition wall and a fourth partition wall was maintained at 260° C., and a metering pump was used to continuously supply from each supply line the raw materials including a liquid mixture of NMP and p-dichlorobenzene (pDCB) at a flow rate of 3.53 g/min (NMP:pDCB (weight ratio)=988:268), and 36.00 wt. % NaSH at a flow rate of 0.84 g/min. At the same time, a distillation device connected to the PAS continuous production apparatus was used, and water was continuously removed from the PAS continuous production apparatus while controlling the pressure to a gage pressure of 0.32 MPa using a pressure regulation valve. In addition, the pDCB in the water that was removed was separated with a settling tank and returned to the PAS continuous production apparatus. Furthermore, gas from the distillation device was washed with 1.37 g/min of 15.84 wt. % NaOH and 0.50 g/min of NMP supplied to a gas absorption column, and the gas was then released. At that time, the total amount of the NMP and NaOH aqueous solution that had absorbed gas was supplied to the reaction vessel of the upstream side of the first partition wall from the upstream side. Through this, the water (total amount of water contained in the various reaction raw materials) supplied to the reaction vessel of the upstream side of the first partition wall from the upstream side was 17.4 moles per mole of the sulfur source. The polymerization reaction product was continuously overflowed and discharged from the reaction apparatus, and cooled. At this time, the average residence time of the polymerization reaction product in the reaction apparatus was approximately 3 hours.

After the above operations were continued for 5 hours, the water content amount of the reaction mixture in a reaction vessel delimited by the first partition wall and the second partition wall from the upstream side was measured, and was found to be 0.7 moles per mole of the raw material sulfur source. Moreover, when the reaction mixture that had overflowed from the reaction apparatus at that time was analyzed, the conversion ratio of the raw material pDCB was 97.0%. The reaction mixture was washed and filtered three times with acetone of the same weight, and three times with water, the obtained cake was dried at 80° C. for 8 hours in a vacuum, and a PPS powder was obtained. The weight average molecular weight Mw obtained through GPC of this PPS powder was 27300.

Example 2

A continuous production apparatus that was the same as the apparatus illustrated by FIG. 3 with the exception of having eleven reaction vessels formed by dividing the housing chamber body by ten disk-shaped dividing plates was used. With this continuous production apparatus, the housing chamber body had dimensions of an inner diameter of 108 mm by a length of 300 mm. All of the ten dividing plates had the same shape, and were provided on a rotating shaft having a diameter of 5 mm. Two anchor-type stirring blades of the same material as the downstream side dividing plate were provided in a cross shape at the upstream side surface of each of the dividing plates in the transfer direction of the reaction mixture. The diameter of the dividing plate was 100 mm, the length of the anchor-type stirring blade in the longitudinal axial direction was 90 mm, and the length in the short axial direction was 40 mm. At a position where a dividing plate was provided, the percentage occupied by the cross-sectional area of the clearance with respect to the vertical cross-section of the internal space of the housing chamber was approximately 14%.

The abovementioned continuous production apparatus was charged with 1700 g of N-methyl-2-pyrrolidone (NMP) as an organic amide solvent, after which nitrogen gas was flowed from the downstream side of the eleventh reaction vessel counted from the upstream side in the transfer direction of the reaction mixture, and while the nitrogen gas was being flowed, an external heater installed at the bottom portion of the housing chamber was used to maintain a temperature 1 of the second reaction vessel counted from the upstream side at 230° C., a temperature 2 of the fifth reaction vessel at 260° C., and a temperature 3 of the eleventh reaction vessel at 260° C. Here, the flow rate of the nitrogen gas was 0.1 NL/min, and in a standard state, the linear velocity of the nitrogen gas passing through the clearance of the dividing plate was 0.8 cm/s.

A metering pump was used to continuously supply, from each supply line, raw materials including an NMP-pDCB liquid mixture at a flow rate of 3.76 g/min (NMP:pDCB (weight ratio)=1852:1382), and 36.5 wt. % NaSH at a flow rate of 1.63 g/min.

At the same time, a distillation device connected to the continuous production apparatus was used, and water was continuously removed from the continuous production apparatus while controlling the pressure to a gage pressure of 0.32 MPa using a pressure regulation valve. In addition, the pDCB in the water that was removed was separated with a settling tank and returned to the continuous production apparatus. In addition, gas from the distillation device was washed with 2.68 g/min of 16.32 wt. % NaOH and 0.50 g/min of NMP supplied to a gas absorption column, and the gas was then released. At that time, the total amount of the NMP and NaOH aqueous solution that had absorbed gas was supplied to the first reaction vessel from the upstream side.

The water (total amount of water contained in the various reaction raw materials) supplied to the first reaction vessel counted from the upstream side was 17.2 moles per mole of the sulfur source.

The polymerization reaction product was continuously overflowed and discharged from the reaction apparatus, and cooled. At this time, the average residence time of the polymerization reaction product in the reaction apparatus was 4 hours.

After the above operations were continued for 6 hours, the water content amount of the reaction mixture in a reaction vessel delimited by the first dividing plate and the second dividing plate from the upstream side was measured, and was found to be 1.0 moles per mole of the raw material sulfur source. Moreover, when the reaction mixture that had overflowed from the reaction apparatus at that time was analyzed, the conversion ratio of the raw material pDCB was 94.7%. The reaction mixture was washed and filtered three times with acetone of the same weight, and three times with water, the obtained cake was dried at 80° C. for 8 hours in a vacuum, and a PPS powder was obtained. In terms of polystyrene, the weight average molecular weight Mw obtained through GPC of this PPS powder was 11000.

The following is clear from each of the above examples. Even in cases in which the total water content amount of the reaction raw materials is large, there is no need to adjust in advance the water that is contained in these various reaction raw materials. Therefore, the production time of high molecular weight PAS can be easily reduced by directly inserting these various reaction raw materials into the above-described PAS continuous production apparatus.

REFERENCE SIGNS LIST 1a, 1b, 1c: Reaction vessel
2: Housing chamber
3a, 3b: Side wall
4: Organic polar solvent supply line
5: Sulfur source supply line
6: Dihalo aromatic compound supply line
7: Reaction mixture recovery line
8a, 8b: Partition wall
9a, 9b, 9c: Reaction mixture
10a, 10b, 10c: Stirring blade
11: Stirring shaft
12: Rotational driving device
13: Exhaust line
14: Dehydration unit
15: Organic polar solvent recovery line
16: Vapor recovery line
17: Gas-liquid separation unit
18: Gas recovery line
19, 24: Reaction raw material separation and recovery unit
20: Waste gas line
21, 26: Reaction raw material resupply line
22, 27: Reaction raw material resupply unit
23: Liquid recovery line
25: Waste water line
28: Gas feeding unit
29: Gas feeding line
30a, 30b: Dividing plate
31: Rotating shaft
100, 200, 300, 400: PAS continuous production apparatus
H: Horizontal plane

The invention claimed is:

1. A method for producing polyarylene sulfide, the method comprising:
   a supplying step of supplying reaction raw materials to at least one of a plurality of reaction vessels that mutually communicate through a gas phase;
   a polymerizing step of carrying out a polymerization reaction using the plurality of reaction vessels; and
   a dehydrating step of removing at least some of the water present in the plurality of reaction vessels,
   wherein each of the steps is carried out in parallel, and a reaction mixture is transferred sequentially between the reaction vessels;
   the amount of water contained in the reaction mixture in at least one of the reaction vessels of the plurality of reaction vessels is from 0.1 moles to less than 3 moles per mole of a sulfur source;
   the reaction raw materials include an organic polar solvent, a sulfur source, and a dihalo aromatic compound; and
   the total amount of water contained in the reaction raw materials that are supplied in the supplying step is 3 moles or more per mole of the sulfur source, wherein the reaction vessels are separated by dividing plates or partition walls, or the reaction vessels are connected in the decreasing order from a highest maximum liquid surface level of liquid that can be accommodated in each reaction vessel, and a height difference in the maximum liquid surface levels is used to sequentially transfer the reaction mixture.

2. The polyarylene sulfide production method according to claim 1, wherein at least some of the plurality of reaction vessels are connected in series.

3. The polyarylene sulfide production method according to claim 1, wherein the supplying step, the polymerizing step, the reaction mixture transferring step, and the dehydrating step are carried out in parallel.

4. The polyarylene sulfide production method according to claim 1, wherein a feeding step of feeding an inert gas from a downstream side towards an upstream side in a direction of transfer of the reaction mixture is carried out in parallel with each of the steps.

5. The polyarylene sulfide production method according to claim 1, wherein a separating and recovering step of separating and recovering some of the reaction raw materials, and a resupplying step of supplying at least a portion of the raw materials to at least one of the reaction vessels are carried out in parallel with each of the steps.

6. The polyarylene sulfide production method according to claim 1, wherein the reaction vessels are provided so that internal temperatures thereof become higher from an upstream side to a downstream side in the transfer direction of the reaction mixture.

7. The polyarylene sulfide production method according to claim 1, wherein the pressure in the reaction system is from 0.01 MPa to 0.8 MPa.

8. The polyarylene sulfide production method according to claim 1, further comprising a step of increasing the weight average molecular weight of the polyarylene sulfide that is obtained after the polymerizing step.

9. The polyarylene sulfide production method according to claim 1, wherein when the total amount of water contained in the reaction raw materials that are supplied is 100 mass %, the amount of water contained in a supply reaction vessel to which the reaction raw materials are supplied is from 5 mass % to 99 mass %, and the amount of water contained in an adjacent reaction vessel that is adjacent to the supply reaction vessel on the downstream side is from 5 mass % to 50 mass %.

10. The polyarylene sulfide production method according to claim 1, wherein the total amount of water contained in the organic polar solvent, the sulfur source, and the dihalo aromatic compound that are supplied as reaction raw materials in the supplying step is 3 moles or more per mole of the sulfur source.

* * * * *